(12) United States Patent
Fournier

(10) Patent No.: US 6,790,531 B2
(45) Date of Patent: Sep. 14, 2004

(54) PROCESS FOR THE PROTECTION OF FLEXIBLE SILICONE MEMBRANES, PARTICULARLY IN THE CASE OF MOLDING BY RESIN TRANSFER

(75) Inventor: Alain Fournier, Saint Lys (FR)

(73) Assignee: Airbus France, Toulouse (FR)

( * ) Notice: Subject to any disclaimer, the term of this patent is extended or adjusted under 35 U.S.C. 154(b) by 13 days.

(21) Appl. No.: 10/095,082

(22) Filed: Mar. 12, 2002

(65) Prior Publication Data

US 2002/0182327 A1 Dec. 5, 2002

Related U.S. Application Data

(63) Continuation-in-part of application No. 09/511,304, filed on Feb. 23, 2000, now abandoned.

(30) Foreign Application Priority Data

Feb. 23, 1999 (FR) .............................................. 99 02382

(51) Int. Cl.[7] .............................................. B32B 25/20
(52) U.S. Cl. ........................ 428/447; 427/387; 528/24; 528/32; 528/901; 264/338
(58) Field of Search ........................ 428/447; 427/387; 528/24, 32, 901; 264/338

(56) References Cited

U.S. PATENT DOCUMENTS

| | | |
|---|---|---|
| 3,619,323 A | 11/1971 | Stebleton |
| 3,639,155 A | 2/1972 | Hartlein et al. |
| 4,317,692 A | 3/1982 | Niconchuk |
| 4,547,544 A | 10/1985 | Allardice |
| 4,678,815 A | 7/1987 | Hoffman |
| 4,822,436 A | 4/1989 | Callis et al. |

FOREIGN PATENT DOCUMENTS

| | | |
|---|---|---|
| EP | 0 123 487 | 10/1984 |
| EP | 0 219 778 | 4/1987 |
| EP | 0 385 919 | 9/1990 |
| EP | 0 529 872 | 3/1993 |
| GB | 2 045 824 | 11/1980 |

OTHER PUBLICATIONS

English translation of the abstract of EP 219778 from Derwent.*

* cited by examiner

Primary Examiner—Kuo-Liang Peng
(74) Attorney, Agent, or Firm—Young & Thompson

(57) ABSTRACT

Process for treating a flexible bi-constituent self-demolding silicone membrane used as a counterform particularly for resin transfer molding. The membrane is coated with a thin layer of at least one monoconstituent silicone which is a polysiloxane cross-linkable at ambient temperature in the presence of the moisture in air. The polysiloxane corresponds to the formula (I):

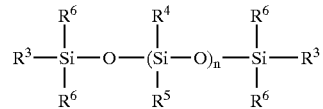

in which:
the substituents $R^3$, $R^4$, and $R^5$ are selected from alkyl or aryl radicals,
$R^6$ represents an alkyloxy group, an alkenyloxy group, an alcanoyloxy group, an amino group, a ketiminoxy group, an amido group, an aminoxy group.

11 Claims, No Drawings

PROCESS FOR THE PROTECTION OF FLEXIBLE SILICONE MEMBRANES, PARTICULARLY IN THE CASE OF MOLDING BY RESIN TRANSFER

The present application is a continuation-in-part of co-pending application Ser. No. 09/511,304, filed Feb. 23, 2000, now abandoned.

The present invention relates to a process for the protection of flexible silicone bi-constituent membranes, more particularly flexible self-demolding silicone membranes, particularly in the case of the use of molding by resin transfer.

Molding by resin transfer consists in preparing forms having facing surfaces generating a volume having the profile of the piece to be produced, placing on the walls of this volume a flexible silicone membrane to permit demolding of the finished piece, and injecting resin into the space delimited by said membrane. The walls of the mold can be heated so as better to control the polymerization reaction.

This process is very useful in the automotive industry and in the field of sports and leisure. It permits obtaining better technical performance, reducing the production cycles.

Initially useful only for pieces of small dimensions, this process tends to be more generalized and to find applications including in the production of pieces of large structure as in the aeronautical field.

Epoxide resins are the most widely used. They serve particularly for the production of structural members.

The resins of the phenolic type have particularly interesting advantages in the field of aeronautics, because they are self-extinguishing and the smoke emitted, of small volume, is not harmful. They thus permit satisfying the fire and smoke requirements for material.

Each resin is sold with its catalyst and there is more particularly known one of them which contains para-toluene sulfonic acid.

The flexible bi-constituent silicone self-demolding membranes used in molding by resin transfer are obtained by cross-linking of a silicone rubber in the presence of a catalyst. In the technical field in question, the expression "silicone rubber" is used conventionally to designate a polycondensate of polysiloxane of high molecular weight cross-linkable with heat. The expression "vulcanization" is generally used to designate cross-linking.

Such a silicone rubber is a linear polymer constituted by recurring siloxane units carrying substituents of the alkyl or aryl type, said polymer bearing at one of its ends a group comprising a vinyl function which is capable of reacting in a radicular way, and at the other end a non-reactive group under conditions of polymerization radicularly, said blockage group. The substituents of recurrent siloxane units as well as the blockage group are generally selected independently from each other from alkyl radicals having preferably 1 to 5 carbon atoms, fluorinated alkyl radicals having preferably 1 to 5 carbon atoms, phenyl radicals possibly having a substituent selected from linear or branched alkyl radicals having at most 5 carbon atoms, naphthyl radicals. For the blockage group, there is generally preferred a methyl group. For the recurrent substituent units, there is preferred methyl or alkyl radicals having a trifluoromethyl terminal group.

The substituent which comprises a vinyl group and which permits cross-linking the silicone rubber in a radicular way in the presence of a peroxide (for example benzoyl peroxide, dicumyl peroxide or lauroyl peroxide), can be for example a vinyl, an allyl, a butene-3-yl or a pentene-4-yl.

Among the silicone rubbers corresponding to the above formula, can be cited:

VMQ rubbers (polydimethyl/vinylmethylsiloxane) whose chain is constituted by —Si(CH$_3$)$_2$O— units and whose end groups are on the one hand vinyl and on the other hand methyl.

PVMQ rubbers (polydimethyl/vinylmethyl/-diphenylsiloxane) whose chain is constituted by —Si(CH$_3$)$_2$O— units, —Si($\phi$)$_2$—O— units, in which $\phi$ represents a phenyl group, and whose end groups are on the one hand vinyl and on the other hand methyl FVMQ rubbers (poly γ trifluoropropylmethyl/-vinylmethylsiloxane) whose chain is constituted by —Si(—CH$_2$CH$_2$CF$_3$) (—CH$_3$)—O— units and by —Si (—CH$_3$) (—CH=CH$_2$)—O— units, and whose end groups are on the one hand vinyl and on the other hand methyl.

The silicone rubbers identified by the VMQ, PVQM and FVMQ denominations are defined by the ASTM D 1418-83 standard.

A bi-constituent silicone material of the prior art used for producing demoldable membranes is a material obtained after cross-linking a silicone rubber as defined above. It is constituted by chains analogous to those of silicone rubber, two chains being interconnected by at least one —C—C—C— connection between an Si atom and one of the chains and an Si atom of the other chain.

The flexible silicone self-demolding membrane has numerous qualities which are essential for the good practice of the process. There is no machining, it is easy to demold because it suffices to pull on the membrane to peel it relative to the piece, and the surface condition of the obtained piece is excellent.

By contrast, this membrane has an important drawback: in contact with the resin, it degrades by depolymerization of the polysiloxane under the action of oxidating or radicular species. The result is a degradation of the surface condition, this phenomenon being all the greater upon successive uses.

This premature aging makes the membrane lose all its demolding qualities and leads as a result to a decrease in the quality of the surface condition of the piece. This fact requires the user to proceed to replace frequently the membrane, which replacement is hence prejudicial to the economics of the molding process by resin transfer.

It has been noted that one of the possible explanations of the degradation of the membrane could be the action of the phenyl groups of the resin. The simplified chemical equation of such a reaction can be written in the following manner (R$^1$ and R$^2$ represent substituents of the recurring siloxane units of the siloxane rubber, and R represents the resin carrying the OH group):

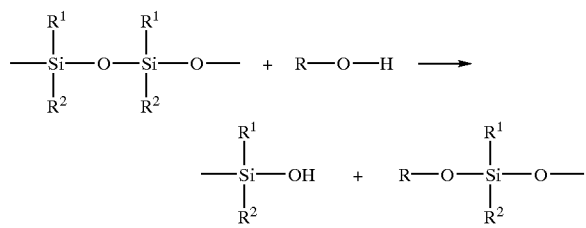

Notice the rupture of the silicone chain which marks the degradation of the flexible membrane.

The acid catalysts permits triggering the degradation by rupture of the polysiloxane chain which depolymerizes and it accelerates the degradation of the membranes. There is thus noted a strong decrease in the demolding capacity of the membrane which becomes, during further use, more and more difficult to separate from the piece, which gives rise simultaneously to a degradation of the surface condition of said piece. The degradation starts in limited regions and propagates rapidly over all the surface of the membrane. Statistics show that these membranes can be used about a dozen times.

One solution consists in decreasing the aggressive power of the catalyst, but the results obtained have been less promising and the possibilities of modification are relatively reduced because it is necessary to preserve its primary qualities of initiating and managing the polymerization reaction.

The object of the invention is to provide a process for treatment of the flexible self-demolding silicone membrane to avoid premature degradation and to increase the potential for use. This treatment must permit preserving the demolding properties, the good surface condition of the piece produced, which is generally on a par with avoiding increase in a substantial manner of the thicknesses.

To this end, the process according to the invention for the treatment of a flexible self-demolding bi-constituent silicone membrane used as a counterform particularly for molding by resin transfer, is characterized in that said membrane is coated with a thin layer of at least one monoconstituent silicone, said monoconstituent silicone being a polysiloxane cross-linkable at ambient temperature in the presence of the moisture in the air.

As examples of such a polysiloxane, can be cited those corresponding to the formula (I):

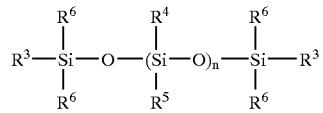

in which:

$R^3$, $R^4$ and $R^5$ are alkyl or aryl substituents, selected independently from each other preferably from alkyl radicals having 1 to 5 carbon atoms, perfluoronated alkyl radicals having 1 to 5 carbon atoms, phenyl radicals possibly substituted with a group selected from linear or branched alkyl radicals (for example a methylphenyl radical or a methylethylphenyl radical), naphthyl radicals. The methyl substituents are generally preferred.

$R^6$ is an alkyloxy group, an alkenyloxy group, an alcanoyloxy group, an amino group, a ketiminoxy group, an amido group (for example acetamido or methylbenzamido), an aminoxy group (for example diethylaminoxy).

As examples of $R^6$ groups, can be cited particularly:

| Alkyloxy | R'O— | R' being alkyl, preferably methyl |
| Alkenyloxy | R'O— | R' being alkenyl, for example isopropenyl |
| Alcanoyloxy | R'C=O— <br> \| <br> O | R' being alkyl, preferably methyl or heptyl |

-continued

| Amino | R'NH— | R' being a linear alkyl, for example butyl, or a cycloalkyl, for example cyclohexyl |
| Ketiminoxy | R'R"C=N—O— | R' and R" each being alkyl, preferably methyl |
| Amido | R'—C—N— <br> \|\| \| <br> O R' | R" being alkyl, preferably methyl, R' being alkyl, for example methyl, or phenyl |
| Aminoxy | R'R"N—O— | R' and R" being alkyl, for example methyl or ethyl |

A polysiloxane corresponding to formula (I) can be obtained by a process consisting in reacting a polysiloxane HO—[Si($R^4R^5$)—O]$_m$—H with a $R^3$Si($R^6$)$_3$ siloxane in a stoechiometric ratio 1/2. The vulcanization (or cross-linking) of the polysiloxane having terminal $R^6$ groups takes place spontaneously in the presence of water, which can be ambient moisture in the air, without the use of heat or catalyst.

When $R^6$ is an acetate group $CH_3CO_2$—, the reaction scheme in two steps for the cross-linking is as follows:

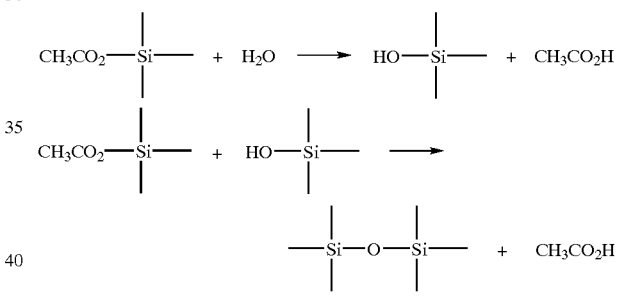

More particularly, the process of treating the bi-constituent membrane consists in applying to said membrane a layer of material constituted by at least one silicone of formula (I), and exposing the layer to air at ambient temperature, for a time sufficient to obtain vulcanization.

The layer preferably has a thickness between 0.1 mm and 0.5 mm.

This thin layer serving as a barrier to degradation is preferably deposited on a fresh membrane.

The presence of this thin layer of cross-linked silicone (1) between the flexible silicone membrane and the resin, prevents contact between the resin and the flexible membrane.

The problems raised by such a use of a complementary product are essentially the adherence of this product to the flexible self-demolding silicone membrane and the qualities of demolding, this while not modifying the thickness other than almost negligibly so as not to change the sizes of the pieces. The choice of the silicone (1) permits obtaining sufficient adherence to the membrane, preserving the demolding qualities of the membrane for a large number of uses. Such a product is particularly sold under the name Rhodorsil Caf 4 by the company Rhone Poulenc. It is a silicone of the formula (I) in which $R^3$, $R^4$ and $R^5$ each represent methyl, and $R^6$ represents an acetoxy group. Such a monoconstituent silicone has the advantage of being of the same nature as the flexible self-demolding silicone, which permits good adherence.

The thin layer of monoconstituent silicone can thus be withdrawn to be replaced by a new barrier layer, which avoids the superposition of layers and hence the increase of the thickness of the self-demolding silicone membrane.

It is noted that the product thus produced which is constituted of a flexible self-demolding silicone coated with a thin barrier layer of monoconstituent silicone, has other advantages:
- the demolding quality is maintained because it is a matter of a silicone whose anti-adherent capabilities are known,
- the flexible membrane is protected during several successive uses,
- the qualities of surface condition are surprisingly improved. This can perhaps be explained by the fact that the thin barrier layer matches the surface condition of this membrane whilst smoothing over the surface defects because it fills any possible depressions.

The industrial use proposes different modes of application of this thin barrier layer because such a product is present in the form of a viscous paste which permits spreading in a pasty condition on the surface in question of the membrane or coating by vaporization of the product diluted with a solvent suitable for this product. As for all types of products, the adjustment of the viscosity permits controlling the thickness of the thin layer.

It is known that the practice of molding by resin transfer is costly because this latter requires large investments in injection machines provided with heating means, work stations, heating tools, permanent tooling in metallic shapes and renewable tooling such as countermolds which are the flexible membranes of self-demolding silicone.

It is thus of great interest to be able to preserve the membranes for a large number of successive uses. Tests have shown that the membranes could be used twice as long whilst obtaining products substantially of the same quality as with a new membrane, the degradation during use being quite acceptable.

Thus the analysis of photographs of a fresh membrane shows a smooth surface without irregularities.

This same membrane shows roughness after placing in contact with the resin, even simply at ambient temperature and in open air, which is to say under conditions of reduced aggression.

After 2 uses, a white deposit begins to appear.
After 4 uses, roughness appears.
After 8 uses, the roughness is great and the membrane is no longer usable industrially.

If these uses are continued, in addition to the difficulties of using, it is impossible to exceed 12 uses.

At this point, the degraded membrane is coated with monoconstituent silicone and it is possible to proceed with 6 more uses.

The thin barrier layer of monoconstituent silicone is withdrawn and renewed, which permits 4 more uses.

Nevertheless, although the thin layer gives relief, these conditions of use on the membrane after degradation are unfavorable.

In the case of prior application, on a fresh membrane, a first application permits carrying out 7 production cycles.

After withdrawal of this first thin barrier layer and application of a new thin barrier layer, 8 cycles are conducted with altogether improved surface condition and a new withdrawal followed by a new application permits carrying out 7 more cycles.

At the end of these 22 cycles, it is possible:
- either to change the flexible membrane which begins to be degraded if the user desires to maintain optimum surface condition and demolding qualities,
- or to continue if the quality of acceptable surface condition is at a lower level.

It will be seen that it is therefore preferable to treat the flexible membranes before the beginning of any degradation, hence in a fresh condition, and that it is necessary to change the thin barrier layer before its degradation permits aggressive agents to reach the flexible membrane to degrade it in turn.

In the given examples, a single compound with a monoconstituent silicone group has been cited as an example and used in the test, but it is possible in certain cases, as a function of the nature of the self-demolding silicone of the membrane, to resort to a mixture of several monoconstituent silicone compounds.

What is claimed is:

1. A process for treating a flexible self-demolding two-package silicone membrane, comprising a membrane coated with a 0.1–0.5 mm thick layer of at least one-package silicone, wherein said one-package silicone is a polysiloxane cross-linkable at ambient temperature in the presence of moisture, and said membrane is constituted by a material obtained by cross-linking a linear polymer constituted by recurrent siloxane units carrying alkyl or aryl substituents, said polymer carrying at one of its ends a group comprising a vinyl function which is capable of reacting via a radical route, and at the other end a group that is non-reactive under conditions of polymerization via a radical route, a so-called blocking group.

2. The process according to claim 1, wherein the polysiloxane corresponds to formula (I):

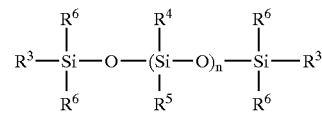

in which:
   $R^3$, $R^4$ and $R^5$ are selected from alkyl or aryl radicals,
   $R^6$ represents an alkyloxy group, an alkenyloxy group, an alkanoyloxy group, an amino group, a ketiminoxy group, an amido group or an aminoxy group.

3. The process according to claim 2, wherein the substituents $R^3$, $R^4$ and $R^5$ are selected independently of each other from alkyl radicals having 1 to 5 carbon atoms, perfluorinated alkyl radicals having 1 to 5 carbon atoms, phenyl radicals possibly carrying a substituent selected from linear or branched alkyl radicals and naphthyl radicals.

4. The process according to claim 1, wherein the one-package silicone is polymerized, in the presence of water.

5. The process according to claim 1, wherein the one-package silicone is polymerized at ambient temperature.

6. The process according to claim 1, wherein the layer of one-package silicone is deposited on a fresh membrane.

7. The process according to claim 1, wherein the substituents of the recurrent siloxane units as well as the blocking group of the material forming the membrane are selected independently from each other from alkyl radicals having 1 to 5 carbon atoms, fluorinated alkyl radicals having 1 to 5 carbon atoms, phenyl radicals possibly carrying a substituent selected from linear or branched alkyl radicals having at most 5 carbon atoms and naphthyl radicals.

8. The process according to claim 1, wherein the substituent of material forming the membrane which comprises a vinyl group is a vinyl, an allyl, a buten-3-yl or a pentene-4-yl.

9. A flexible self-demolding two-package silicone membrane comprising a coating obtained by cross-linking a 0.1–0.5 mm thick layer of at least one-package silicone, wherein said one-package silicone is a polysiloxane cross-linkable at ambient temperature in the presence of moisture and wherein said membrane is constituted by a material obtained by cross-linking a linear polymer constituted by recurrent siloxane units carrying alkyl or aryl substituents, said polymer carrying at one of its ends a group comprising a vinyl function which is capable of reacting via a radical route, and at the other end a group that is non-reactive under the conditions of polymerization via a radical route, a blocking group.

10. The membrane according to claim 9, wherein the polysiloxane corresponds to the formula (I):

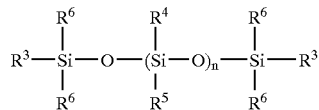

in which:

the substituents $R^3$, $R^4$ and $R^5$ are selected from alkyl or aryl radicals, $R^6$ represents an alkyloxy group, an alkenyloxy group, an alkanoyloxy group, an amino group, a ketiminoxy group, an amido group or an animoxy group.

11. The membrane according to claim 9, wherein the substituents $R^3$, $R^4$ and $R^5$ are selected independently from each other from alkyl radicals having 1 to 5 carbon atoms, perfluorinated alkyl radicals having 1 to 5 carbon atoms, phenyl radicals possibly carrying a substituent selected from linear or branched alkyl radicals and naphthyl radicals.

* * * * *